United States Patent [19]

Smith

[11] 4,049,401
[45] Sept. 20, 1977

[54] APPARATUS FOR SEPARATING SUSPENSIONS OF LIQUIDS IN GAS

[75] Inventor: Stanley Smith, near Bristol, England

[73] Assignee: Rolls-Royce (1971) Limited, London, England

[21] Appl. No.: 655,098

[22] Filed: Feb. 4, 1976

[30] Foreign Application Priority Data

Feb. 10, 1975   United Kingdom ................ 5518/75

[51] Int. Cl.² ............................................ B01D 19/00
[52] U.S. Cl. ...................................... 55/184; 55/401; 55/409; 55/487; 55/525
[58] Field of Search ............... 55/184, 185, 401, 408, 55/409, 487, 525

[56] References Cited

U.S. PATENT DOCUMENTS

| | | | |
|---|---|---|---|
| 1,051,017 | 1/1913 | Schmidt | 55/408 X |
| 1,580,380 | 4/1926 | Macdonald | 55/409 X |
| 3,224,173 | 12/1965 | Webb | 55/408 |
| 3,240,003 | 3/1966 | Stroup et al. | 55/408 |
| 3,561,195 | 2/1971 | Bouru | 55/409 |
| 3,880,626 | 4/1975 | Griwatz et al. | 55/487 X |

*Primary Examiner*—Frank A. Spear, Jr.
*Assistant Examiner*—Richard W. Burks
*Attorney, Agent, or Firm*—Stevens, Davis, Miller & Mosher

[57] ABSTRACT

A centrifugal separator for separating suspensions of oil mist in air and especially intended for use with aircraft engines comprises a rotatable chamber filled with a relatively rigid porous material and driven by a hollow shaft.

An inlet for the suspension is provided in one end wall of the chamber and separate outlets for oil and air in the form of an apertured chamber outer wall and apertures in the shaft respectively.

8 Claims, 1 Drawing Figure

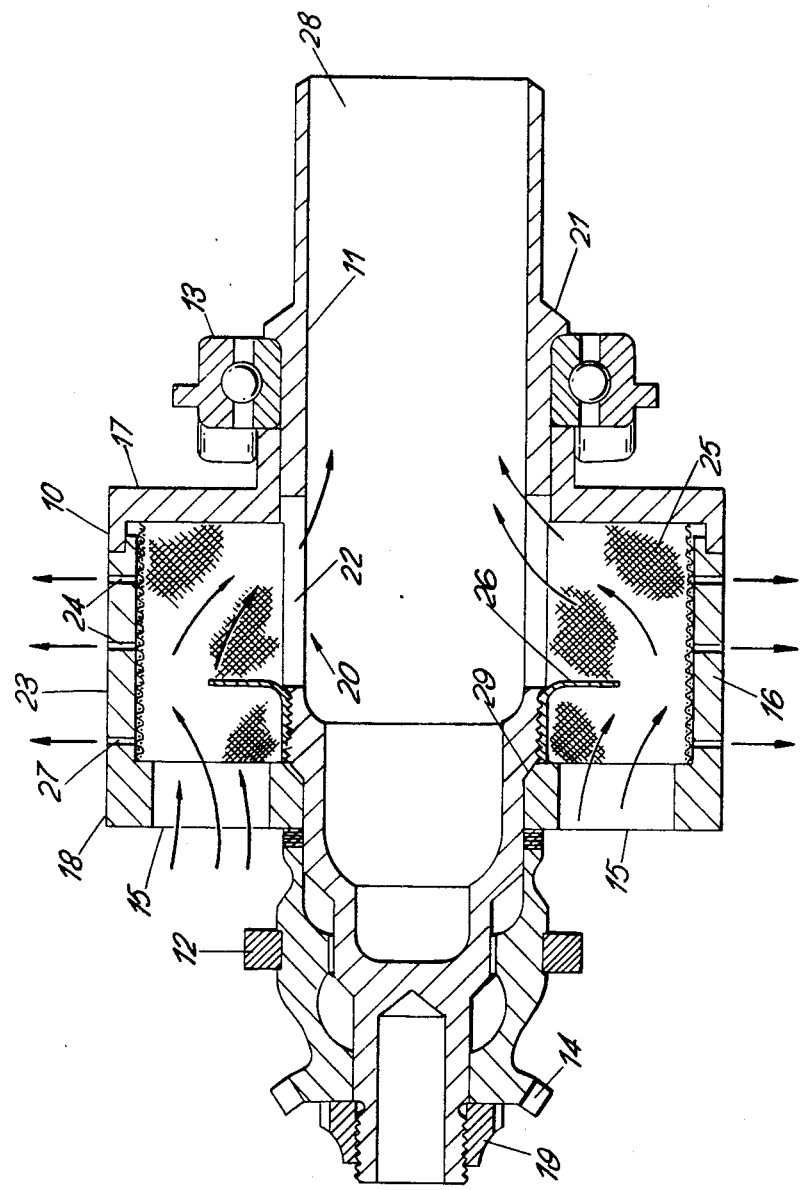

APPARATUS FOR SEPARATING SUSPENSIONS OF LIQUIDS IN GAS

The present invention relates to apparatus for separating suspensions of liquids in gas, and has particular reference to apparatus for separating a suspension of oil mist dispersed in air.

The compressed air streams used in gas turbine engines to pressurise labyrinth seals for the engine main bearings in order to avoid excessive loss of lubricating oil, almost invariably become contaminated with oil in the form of suspensions of droplets dispersed in the air.

Centrifugal separators have been extensively used in attempts to remove the majority of oil mist from the compressed air streams after their passage through the bearings. Contamination of the compressed air with oil mist is particularly disadvantageous because, loss of contaminated air from labyrinth seals in the compressor causes fouling of the engine parts and produces noxious and unpleasant products in air drawn from the compressor for cabin pressurisation. A further disadvantage is, of course, the increased loss of lubricating oil from the engine oil tank, necessitating larger capacity tanks and adding to the weight of the engine. It has been a particular problem that even relatively small inefficiencies in such separators leads to the loss of a significant quantity of lubricating oil each hour of operation of the engine.

In a known form of centrifugal separator a drum is rotated within a stationary casing by an electric motor. A suspension of oil mist in air is fed into one end of the drum and centrifuged outwardly by radial vanes joined to the drum outer wall. The vanes are lined on one face with a soft deformable porous material which assists in the coagulation of the oil particles and subsequent migration of oil droplets towards the cylindrical wall of the drum. The cylindrical wall of the drum is perforated and both oil droplets and air emerge through the perforations. The oil impinges on a stationary cylindrical wall coaxial with the drum and climbs this wall, because of the rotational energy supplied to the oil droplets, until it reaches and spills over a lip on the cylindrical wall. After this the oil is returned to a sump and the air which is still contaminated with some oil passes through a static separating mesh on which some of the remaining oil coalesces and drips back to the sump over the lip of the stationary cylindrical wall.

This construction of centrifugal separator is not however suitable for use with aircraft gas turbine engines for several reasons. The known separator is only suitable for use with the drum axis vertical whereas for use with aircraft a separator must be capable of operating at all attitudes, and when subjected to various accelerations. Furthermore because the air and oil leave the drum through the same perforations and remain in contact for a while there is presented the opportunity for oil to pass back into the air stream.

The present invention proposes an improved form of separator suitable for use in aircraft and lends itself to the construction of a modular readily interchangeable separator of relatively straight-forward construction that is relatively economical to manufacture.

According to the present invention there is provided apparatus capable of separating a suspension of liquid in a gas comprising a rotatable chamber, and inlet to the chamber for admitting said suspension, an outlet for the liquid in a radially outer part of the chamber and an outlet for gas in a radially inner part of the chamber and wherein there is further provided a packing within the chamber comprising a relatively rigid matrix pervious to the liquid.

In one embodiment the rotatable chamber is mounted on a hollow shaft and said gas outlet comprises apertures in the shaft wall.

In a preferred embodiment the rotatable chamber is adapted for driving engagement by the shaft and is removably secured thereto by locking means engaging one end of the shaft.

An embodiment of the invention will now be described by way of example only, and with reference to the accompanying drawings.

The sole FIGURE of drawing shows a sectional view of the centrifugal separator.

In the drawing a rotatable centrifugal separator 10 is mounted on a shaft 11 of a gearbox for a jet engine. The shaft 11 is rotatably supported in bearings 12, 13 and is driven from a main shaft of the engine (not shown) by way of bevel gear 14. A suspension of air and oil mist is passed via the gearbox casing to the inlet 15 for the separator 10. The separator 10 comprises a rotatable chamber 16 formed by the rear flange 17, the shaft 11 and a front flange and side face member 18. The assembly is clamped together by a nut 19 on the end of shaft 11 which bears via the bevel gear 14 on the member 18, and by the shoulder 21 and the bearing 13.

A gas outlet 20 is provided in the radially inner part of the separator in the form of slotted apertures 22 communicating with the hollow interior 28 of the shaft 11 and outlets for the liquid oil are provided in the radially outer cylindrical wall 23 of the separator in the form of radial drillings 24 in the member 18.

Inside the separator there is provided a packing 25 comprising a relatively rigid porous matrix and a baffle 26 upstream of the gas outlet 20.

In operation the suspension of oil in air enters the inlet 15 under pressure and is caused to flow radially outwardly by the baffle 26. The further away the suspension can be taken from the axis of rotation of the separator the larger is the centrifugal force field acting on the oil mist and the heavier particles are thrown to the outside and removed from the separator via the drillings 27. The remaining suspension then flows radially inwardly and as it does so particles coalesce and flow radially outwardly along the matrix structure to be expelled via the drillings 24. Air relatively free from mist then leaves the separator via the gas outlet 20 and is carried to a point of use via the bore 22 of the shaft 11.

We have found that a most satisfactory pervious relatively rigid matrix material is the product "Retimet" (Registered Trade Mark) made by the Dunlop Company Ltd. used in its "60" grade form. "Retimet" (Registered Trade Mark) comprises a mesh of metal formed by plating a metal onto a synthetic open-celled foamed structure and subsequently leaching out or otherwise removing the synthetic material. By relatively rigid is meant that the matrix is capable of withstanding the centrifugal and other loads imposed on it during operation of the separator without suffering a significant amount of deformation which would tend to close the mesh and unduly restrict the flow of the suspension therethrough. One particular advantage that stems from the use of "Retimet" (Registered Trade Mark) is that it can be readily machined approximately to size and is sufficiently deformable to allow it to be sized by pressing prior to its insertion in the rotatable chamber.

However, the matrix material could be formed of any suitable mesh material for example, wire gauze or expanded mesh, a plurality of pierced plates, or alternatively a bristle structure. The essential feature of the matrix is that it should provide a relatively large surface area for oil particles to collect on, and to provide relatively unobstructed flow paths so that oil may migrate radially outwards and air radially inwards. A bristle structure, perhaps of radially orientated wire bristles, whilst advantageous in some respects suffers the drawback that should a bristle become detached it could do considerable damage should it travel along an oilway.

In a modification we have found it advantageous to provide a relatively more pervious matrix upstream of the baffle 26 to assist in initially extracting the larger particles of liquid. Retimet "20" has been found to be satisfactory.

From our experiments we have found that the above describe construction of separator results in the loss of only a few drops of oil at the end of an hours continuous running and furthermore the efficiency of the device is not greatly impaired by slower rotational speeds of the separator or by increasing the pressure differential across it.

The efficiency of the separator has proved so effective that it has proved possible to dispense with the baffle and the differing grades of porous material without any significant loss of efficiency.

In one separator the rotatable chamber is a cylinder of approximately 5 centimeters length and 5 centimeters diameter and proved capable of effectively separating a suspension of oil in air. The air flow being at the rate of 12 lbs. per minute and the chamber rotating at 16,000 revolutions per minute.

By simply undoing the locking nut 18 the rotatable chamber can be withdrawn from the shaft 11 and interchanged for a fresh or reconditioned chamber. This modular construction is particularly advantageous for simplifying the servicing of the engine with which the separator is associated.

In the illustrated example the driving engagement between the shaft and the rotatable chamber is via the coned hub 29. It is however, also possible to provide a splined driving engagement (not shown) which also has the advantage that it would enable several standard separator units to be stacked onto a shaft to provide a separator of increased capacity.

I claim:

1. Apparatus capable of separating a suspension of a liquid in a gas comprising
    a rotatable chamber having a packing within the chamber comprising a relatively rigid matrix adapted to avoid collapse under centrifugal forces on rotation of the chamber and having interstices defining plural flow passages pervious to the liquid and gas and which provide for both axial and radial movement of the suspension therethrough,
    an inlet at one end of the chamber for admitting said suspension to the chamber,
    an outlet for liquid in a radially outer part of the chamber,
    an outlet for gas in a radially inner part of the chamber at the other end thereof, and
    means for promoting axial movement of the suspension through the chamber.

2. Apparatus according to claim 1, further comprising means for mounting the rotatable chamber on a hollow shaft and wherein said gas outlet in the radially inner part of the chamber comprises apertures in the wall of said hollow shaft.

3. Apparatus according to claim 1, wherein said liquid outlet comprises apertures in a cylindrical outer wall of said chamber.

4. Apparatus according to claim 2, wherein the means for mounting the rotatable chamber on the hollow shaft is further adapted for driving engagement between the shaft and the chamber includes locking means engaging one end of the shaft for removably securing the chamber to the shaft.

5. Apparatus according to claim 1, further comprising a baffle within the chamber adjacent the inlet for moving the suspension initially radially outwardly.

6. Apparatus according to claim 5, wherein the relatively rigid matrix on the inlet side of said baffle is relatively more porous than the matrix on the side remote from the inlet.

7. Apparatus according to claim 4, wherein the inlet to the rotatable chamber comprises an aperture in an end wall of said chamber.

8. Apparatus according to claim 1, wherein said relatively rigid matrix comprises a mesh of metal formed by plating the metal onto a synthetic open celled foamed structure and subsequently removing said synthetic foam.

* * * * *